G. O. GREENFIELD.
CHAIN SICKLE MOWING MACHINE.
APPLICATION FILED APR. 17, 1917.
1,258,671.
Patented Mar. 12, 1918.
2 SHEETS—SHEET 1.
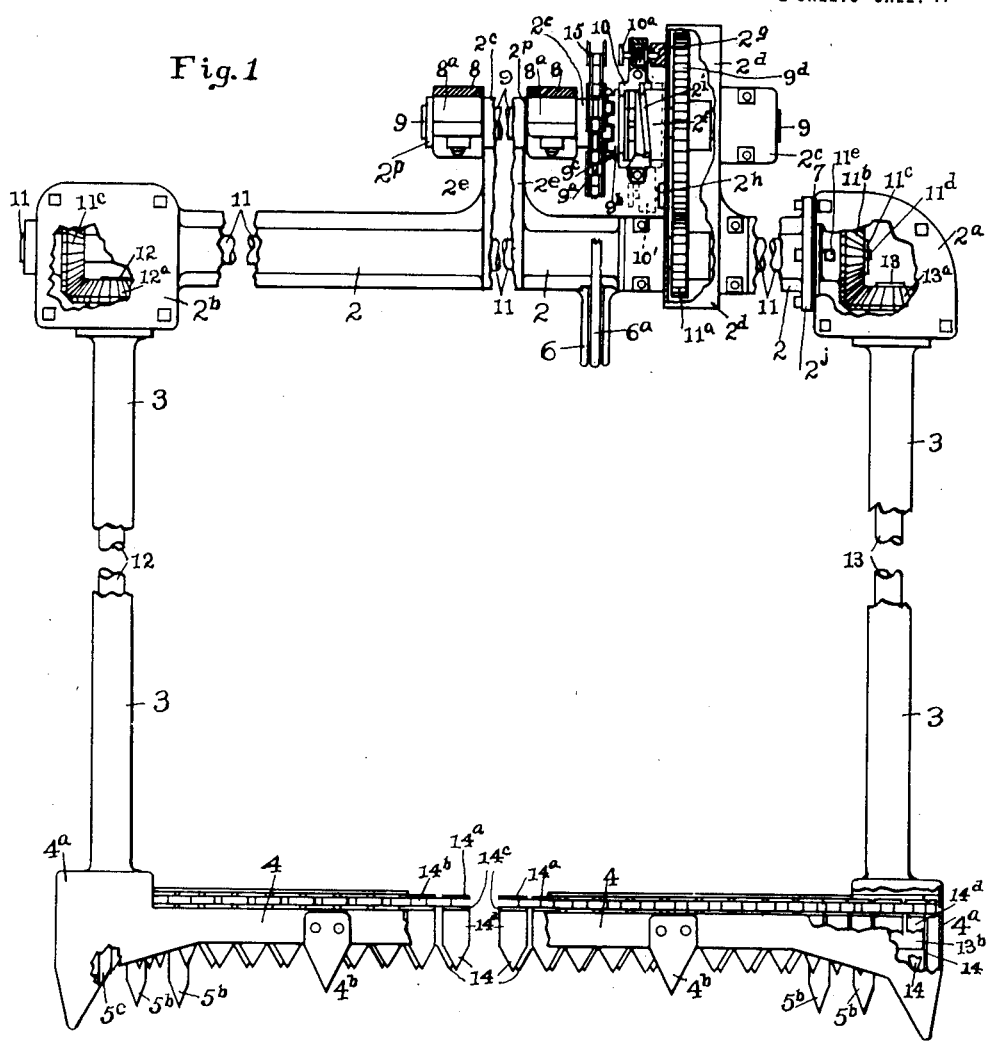
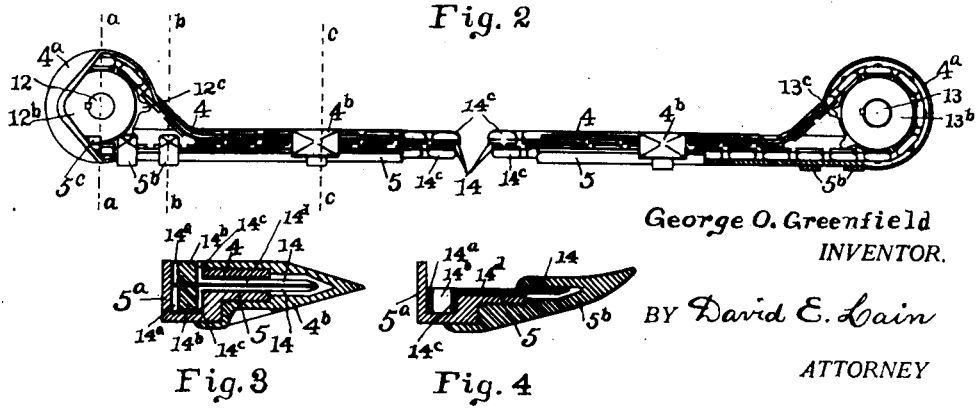
George O. Greenfield
INVENTOR.
BY David E. Cain
ATTORNEY G. O. GREENFIELD.
CHAIN SICKLE MOWING MACHINE.
APPLICATION FILED APR. 17, 1917.
1,258,671.
Patented Mar. 12, 1918.
2 SHEETS—SHEET 2.
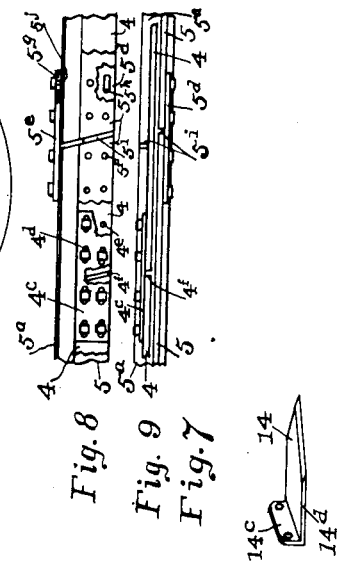
Fig. 8
Fig. 9
Fig. 7
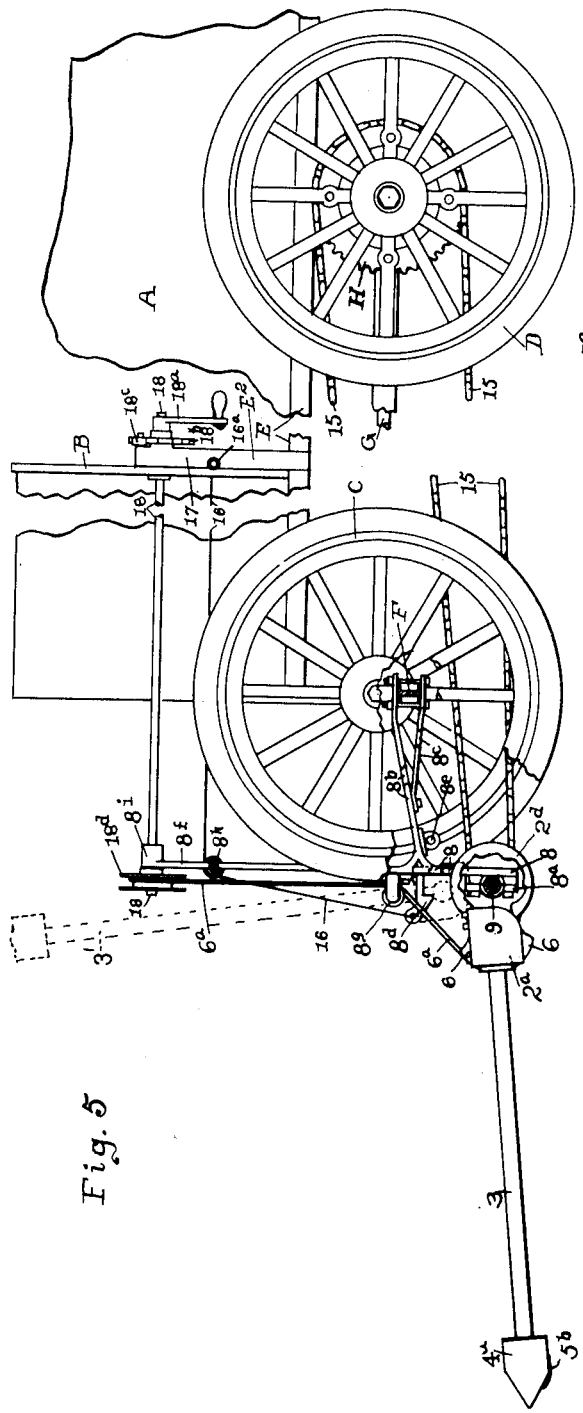
Fig. 5
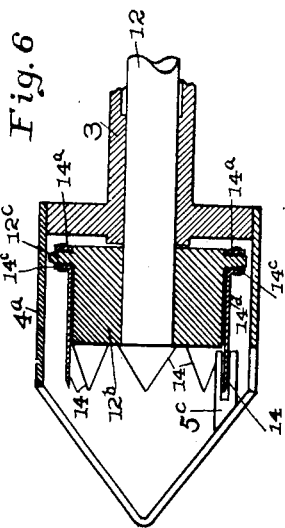
Fig. 6
George O. Greenfield
INVENTOR.
BY David E. Lain
ATTORNEY

UNITED STATES PATENT OFFICE.

GEORGE O. GREENFIELD, OF VAN WICK TOWNSHIP, WHATCOM COUNTY, WASHINGTON.

CHAIN-SICKLE MOWING-MACHINE.

1,258,671.      Specification of Letters Patent.      Patented Mar. 12, 1918.

Application filed April 17, 1917. Serial No. 162,653.

*To all whom it may concern:*

Be it known that I, GEORGE O. GREENFIELD, a citizen of the United States, and a resident of Van Wick township, in the county of Whatcom and State of Washington, have invented certain new and useful Improvements in Chain-Sickle Mowing-Machines, of which the following is a specification.

My invention relates to improvements in mowing machines; and the objects of my invention are, first, to provide a mower in which the cutting operation is performed by a continuously moving sickle chain running close to the ground; second, to provide a construction whereby the sickle sections may cut grass close to the ends of the cutter bar; third, to provide a sickle-chain tension adjustment; and fourth, to adapt the mower for attachment in front of an automobile from which said mower receives its power both for propulsion and operation.

I attain these objects by the mechanism illustrated in the accompanying two sheets of drawings in which,—

Figure 1 is a plan view of my mower shown alone, Fig. 2 is a front elevation of Fig. 1, Fig. 3 is a vertical section, on a larger scale, of Fig. 2 on the line $c$—$c$, Fig. 4 is a vertical section, on a larger scale, of Fig. 2 on the line $b$—$b$, Fig. 5 is a side elevation of an automobile, the major portions of which are broken away or not included, and of my mower attached in operative relation, Fig. 6 is a sectional view, on a larger scale, of Fig. 2 on the line $a$—$a$, Fig. 7 is a perspective view, on a larger scale, of one of the sickle sections, Fig. 8 is a plan view of a broken away portion of the central part of the cutter bars, not shown in Figs. 1 and 2, showing the adjustment joint in said bars, and Fig. 9 is a front elevation view of Fig. 8.

Similar characters refer to similar parts in the several views.

Certain parts are broken away for lack of space and certain parts are broken away to show others hidden thereby.

The main frame of the machine comprises upper and lower slideway bars, or cutter bars, 4 and 5 respectively, the ends of said cutter bars terminate in and are rigidly attached to housing guards $4^a$, $4^a$, side bearing and frame tubes 3, 3, rear bearing and frame tube 2, countershaft bearing and frame tube $2^c$, arms $2^e$, $2^e$ connecting frame parts 2 and $2^c$, and gear case $2^d$ also connecting parts 2 and $2^c$. Counter shaft 9 is mounted for turning in frame tube $2^c$. On said countershaft is mounted a clutch sprocket wheel $9^a$ engaging with chain 15. One part of a positive clutch $9^c$ is rigidly attached to said sprocket wheel. A cylindrical part $2^f$, Fig. 1, of frame member $2^c$ has a helical groove $2^i$. On $2^f$ is mounted clutch collar 10 which is made in two parts bolted together and has an inwardly-projecting pin or tooth engaged with groove $2^i$. Collar 10 has an arm in which is housed pin $10^a$ protracted by a spring. Pin $10^a$ is shown in Fig. 1 as engaged in a hole in a lug $2^g$ on gear casing $2^d$. The left-hand end, Fig. 1, of collar 10 has an interior ring boss engaged in an annular groove in the other part $9^b$ of said positive clutch. Said clutch part $9^b$ is shown in full lines in Fig. 1 as in engagement with clutch part $9^c$ attached to sprocket wheel $9^a$. Clutch part $9^b$ is mounted for sliding on shaft 9 and is engaged therewith by a spline in the usual manner. In Fig. 1 the cap portion of collar 10 is mostly broken away. Drive spur gear $9^d$ is rigidly mounted on countershaft 9 and is housed in gear case $2^d$. Shaft 11 is mounted for turning in frame member 2 parallel with countershaft 9 and cutterbars 4, 5. On the left-hand end of shaft 11, Fig. 1, is rigidly mounted bevel gear $11^c$ in gear case $2^b$, on its right-hand end is mounted bevel gear $11^b$ in gear case $2^a$, and between said bevel gears on shaft 11 is rigidly mounted spur gear $11^a$ engaged with spur gear $2^g$ in gear casing $2^d$. In left-hand frame member 3, Fig. 1, shaft 12 is mounted for turning. Bevel gear $12^a$ is rigidly on the rear end of shaft 12 engaged with bevel gear $11^c$. Sprocket wheel $12^c$ with cylindrical sheave $12^b$ are rigidly mounted on the front end of shaft 12 in one of housing guards $4^a$. Shaft 13 is mounted for turning in right-hand frame member 3, Fig. 1, parallel with shaft 12 and in the same plane with and at right angles to shafts 9 and 11. On the rear end of shaft 13 is rigidly mounted bevel gear $13^a$ engaged with bevel gear $11^b$ and in gear casing $2^a$. Sprocket wheel $13^c$ with cylindrical sheave $13^b$ are rigidly mounted on the front end of shaft 13 in chain relation with sprocket wheel $12^c$ and in the other of housing guards $4^a$. An endless sickle chain comprising back links $14^a$, middle links $14^b$ and sickle links $14^c$ is engaged with sprocket wheels $12^c$ and $13^c$ and both upper and lower parts between said sprocket wheels are caused to slide in a slideway groove formed by the lower slideway bar 5, $5^a$ and the rear edge of slideway bar 4. Said slideway groove is preferably substantially tangent to the lower sides of sheaves $12^b$ and $13^b$. Front chain links $14^c$ are the flanged or turned-up ends of the shanks $14^d$ of sickle sections 14. Said sickle sections comprise the sharpened end 14, shank $14^d$ and flange $14^e$, and, as the chain passes over sprocket wheels $12^c$ and $13^c$, said shanks $14^d$ bear on sheaves $12^b$ and $13^b$ while the sickle sections on the central portions of said chain slide on each other and between slideway bars 4 and 5 with their cutting ends 14 protruding beyond the front edges of said bars.

A central portion of bars 4 and 5 and the sickle chain are broken away in Figs. 1 and 2. In Figs. 8 and 9 a part of said deleted portion of said bars is shown. The oblique ends of bar 4 abut at $4^f$ and are held together by screws through slotted holes $4^d$ in butt plate $4^c$ and in tapped holes $4^e$ in bar 4. The oblique ends of bar 5, $5^a$ abut at $5^l$ and are held by screws through slotted holes $5^h$ and $5^g$ in butt plates $5^d$ and $5^e$ respectively and in tapped holes $5^t$ and $5^j$. This construction permits the adjustment of the forward ends of shafts 12 and 13 to cause the proper tension in the sickle chain. In Fig. 1 the right-hand end of frame member 2 has a flange $2^j$ which is fastened to gear case $2^a$ with screws. Bevel gear $11^b$ is fastened to shaft 11 by straight key $11^d$ and set screw $11^e$ on the same. This method of fastening is used in order that $11^b$ may readily be set at another place on shaft 11 when adjustment ring 7 is increased or diminished in thickness. An adjacent ring 7 is placed between flange $2^j$ and gear case $2^a$. The thickness of ring 7 is suited to cause the shafts 12 and 13 to be parallel after properly adjusting the tension of said sickle chain. Guards $4^b$, $4^b$, etc., are rigidly fastened to bars 4 and 5 and serve to retain said bars in proper relation. But said guard do not serve as shear plates for the sickle sections. Guards $5^b$, $5^b$, $5^b$, $5^b$, are fastened to bar 5 and serve as shear plates for said sickle sections the same as the guards of an ordinary mower cutter bar. Each of guard housings $4^a$ comprises a hollow body partly covering one of cylindrical sheaves $12^b$, $13^b$ and sprocket wheels $13^c$, $13^c$ and joining the ends of bars 4 and 5 and also being fastened to the forward end of one of frame members 2 and 3 and has a guard $5^c$ fastened to its lower side which serves as a shearing plate for the sickle sections. The ends of upper bar 4 are widened where they become a part of the guard housings $4^a$, $4^a$, the upper side of said housings being over the ends of the sickle sections as they pass vertically over the center of sheaves $12^b$ and $13^b$. But the lower bar 5 is not thus widened where its ends become a part of the lower side of said guard housings vertically below the center of said sheaves, Fig. 6. This construction causes grass caught by the sickle sections as they pass under the upper part of housing guards $4^a$ from the outside to be carried forward by the widening edge of bar 4 until said grass is freed from engagement with said sickle sections. But said sickle sections as they enter or leave the lower side of said guard housings can cut all grass between guards $5^c$, $5^b$ and $5^b$. Gear case $2^d$ has a boss $2^h$ diametrically opposite boss $2^g$ having a hole for pin $10^a$ when collar 10 is in its dotted-line position at 10'. When said clutch collar is turned to its dotted position the parts of the clutch are separated, causing the machine to be "out of gear", and said collar can be retained in this position by the engagement of said pin in boss $2^h$.

The mowing mechanism described is attached by two hangers to front axle F of an automobile having front wheel C, rear wheel D, main shaft G, chassis E, fore-board B, and body A. Said hangers have arms $8^b$, $8^b$, braces $8^c$, $8^c$, and standards 8, 8, and are clamped to said axle with bolts through said arms and braces, Fig. 5. Two journals $2^p$, $2^p$, Fig. 1, on frame member $2^c$ are mounted for turning in boxes $8^a$, $8^a$ fastened to the lower ends of hangers 8, 8 parallel to axle F. In these boxes the mowing mechanism is free to turn from its illustrated full-line position to its dotted-line position, Fig. 5. Driver sprocket wheel H is fastened to rear automobile wheel D. The location of sprocket wheel $9^a$ is such as to bring said wheel and wheel H in chain-driving relation when the mowing machine is properly attached to the automobile. Sprocket wheels H and $9^a$ are connected by chain 15 which transmits power from said automobile to said mower. The near standard 8, Fig. 5, has an upward extension $8^f$ the upper end of which has bearing $8^i$ in which the front end of shaft 18 is mounted for turning. The rear end of shaft 18 is mounted in a bearing on the upper end of standard $E^2$ fastened to chassis E. Ratchet wheel $18^b$ is rigidly mounted on shaft 18, and pawl $18^c$ is pivoted on standard $E^2$ in engagement with said ratchet wheel. Hand crank $18^a$ is rigidly attached to the rear end of shaft 18, and drum $18^d$ is rigidly attached to the front end of said shaft. A lead sheave $8^g$ is mounted for turning in a housing fastened to standard $8^f$. A grooved segmental bracket 6 is rigidly attached to frame member 2 in a plane with said lead sheave and drum. One end of a cable $6^a$ is fastened to drum $18^d$ while its other end is fastened to segment of sheave 6 after being riven back of lead sheave 8ᵍ. By turning handle crank 18ᵃ cable 6ᵃ is wound on drum 18ᵈ and the mower is raised to any desired position between its full-line position and its dotted-line position in Fig. 5 and retained therein by pawl 18ᵉ in ratchet wheel 18ᵇ. Dog 8ᵈ is pivoted to hanger 8ᵇ at 8ᵉ in position to engage with frame member 2 when the mower is in its dotted position, Fig. 5. Said dog can retain the mower in said position until the dog is raised out of engagement by pulling on ring 16ᵃ, which is fastened to the rear end of string 16 which passes over sheave 8ʰ on standard 8ᶠ and has its forward end fastened to said dog.

When my mowing mechanism is attached to an automobile as described, with its several parts in their illustrated full-line positions, the running automobile will cause the sickle sections to pass rapidly by each other in shearing relation between the cutter bars 4 and 5 with the sharpened ends of said sections extending beyond the front edges of said bars and thus produce a continuous cutting effect well adapted to mow grass. During the cutting operation the cutter can be raised, retained or lowered at will from said automobile by aid of crank handle 18ᵃ and connected mechanism without retarding said cutting operation. When said operation is finished the machine is thrown "out of gear" by clutch collar 10 and can be retained in its position at 3' by dog 8ᵈ.

I claim:—

In a chain-sickle mower, in combination, a pair of parallel shafts on the front ends of which are rigidly mounted a pair of sprocket wheels and on the rear end of each of which is mounted a bevel gear; an endless sickle chain mounted on said sprocket wheels; a rear shaft at right angles to said parallel shafts on the ends of which are rigidly mounted bevel gears engaged with said bevel gears on said parallel shafts; bearings for said shafts; a frame rigidly connecting said bearings; a housing guard over each of said sprocket wheels rigidly attached to said frame; parallel slideway bars between said housing guards the ends of which are rigidly attached to the same; sickles attached to said chain operable on each other between said slideway bars; and means to adjust the distance between said parallel shafts.

Signed at Bellingham in the county of Whatcom and State of Washington this 10th day of April, A. D. 1917.

GEORGE O. GREENFIELD.